United States Patent
Tranquilla

(10) Patent No.: US 7,214,254 B2
(45) Date of Patent: May 8, 2007

(54) METHOD OF REMOVING MERCURY FROM MERCURY CONTAMINATED MATERIALS

(75) Inventor: James M. Tranquilla, Fredericton (CA)

(73) Assignee: Hendrix Holding Company, Inc., Lexington, SC (US)

( * ) Notice: Subject to any disclaimer, the term of this patent is extended or adjusted under 35 U.S.C. 154(b) by 0 days.

(21) Appl. No.: 10/695,589

(22) Filed: Oct. 28, 2003

(65) Prior Publication Data

US 2005/0089460 A1    Apr. 28, 2005

(51) Int. Cl.
C22B 4/04    (2006.01)
(52) U.S. Cl. ..................................... 75/10.13
(58) Field of Classification Search ............... 75/10.29, 75/670, 10.13; 219/678; 266/144; 373/18, 373/56; 423/107, 127
See application file for complete search history.

(56) References Cited

U.S. PATENT DOCUMENTS

| | | | |
|---|---|---|---|
| 1,599,372 A | 9/1926 | Reed | |
| 4,701,212 A * | 10/1987 | Yan | 75/670 |
| 4,967,486 A * | 11/1990 | Doelling | 34/259 |
| 5,569,154 A | 10/1996 | Navetta | 588/256 |
| 5,632,863 A | 5/1997 | Meador | 201/25 |
| 5,659,110 A | 8/1997 | Herden et al. | |
| 5,672,323 A | 9/1997 | Bhat et al. | 422/172 |
| 5,782,188 A | 7/1998 | Evans et al. | 110/346 |
| 5,787,823 A | 8/1998 | Knowles | 110/344 |
| 5,824,133 A * | 10/1998 | Tranquilla | 75/10.13 |
| 5,891,216 A | 4/1999 | Washburn et al. | 75/670 |
| 5,948,143 A | 9/1999 | Sjostrom et al. | |
| 5,989,486 A | 11/1999 | Washburn et al. | 266/145 |
| 6,024,931 A | 2/2000 | Hanulik | 423/107 |
| 6,074,533 A * | 6/2000 | Tranquilla | 204/157.15 |
| 6,103,205 A | 8/2000 | Wojtowicz et al. | 423/210 |
| 6,268,590 B1 | 7/2001 | Gale et al. | 219/388 |
| 6,277,168 B1 * | 8/2001 | Huang et al. | 75/10.13 |
| 6,322,613 B1 | 11/2001 | Wojtowicz et al. | 95/107 |
| 6,372,187 B1 | 4/2002 | Madden et al. | 422/171 |
| 6,521,021 B1 | 2/2003 | Pennline et al. | 95/134 |
| 6,558,454 B1 | 5/2003 | Chang et al. | 95/901 |

FOREIGN PATENT DOCUMENTS

| | | |
|---|---|---|
| JP | 55076028 | 6/1980 |
| JP | 61060840 | 3/1986 |

* cited by examiner

*Primary Examiner*—Roy King
*Assistant Examiner*—Kathleen McNelis
(74) *Attorney, Agent, or Firm*—Jason A. Bernstein; Powell Goldstein LLP

(57) ABSTRACT

A method of reducing mercury levels in a mercury contaminated material using microwave energy. The method comprises the steps of (a) placing the mercury contaminated material in a microwave reactor; (b) providing a stream of gas in the microwave reactor, the stream causing agitation of the mercury contaminated material; and (c) exposing the mercury contaminated material to microwave radiation so as to raise the temperature to at least 357° C., producing a vapour phase which contains mercury and a treated material. The method also allows for a simultaneous reduction of mercury and carbon levels in the material to be treated as well as the use of a carbon-free material in the reactor.

11 Claims, 1 Drawing Sheet

METHOD OF REMOVING MERCURY FROM MERCURY CONTAMINATED MATERIALS

FIELD OF THE INVENTION

The invention relates to a method of reducing the levels of mercury in mercury contaminated materials. Particularly, the invention relates to the use of microwave energy to reduce the levels of mercury in fly ash and sorbent materials.

BACKGROUND OF THE INVENTION

Mercury is a known contaminant present in the combustion gas stream from industrial incinerators and boilers such as those used in the burning of coal for stream/electricity generation or those used in the municipal solid waste treatment for steam generation or waste removal. The high environmental toxicity of mercury is well established, therefore, mercury scrubbing has become a necessary (albeit expensive) component of flue gas treatment.

Mercury scrubbing from flue gas streams may be accomplished by several methods which vary in complexity, cost and effectiveness. These methods include sorbent (carbon or alkaline) filtering, oxidation, chloridation and others.

Carbon sorbent filtering is well known in the art and utilizes the known sorbent characteristics of fine carbon, particularly activated carbon. Several carbon sorbent techniques have been disclosed and practiced. For example, U.S. Pat. No. 6,558,454 to Chang et al. teaches the injection of raw carbonaceous material into a mercury contaminated gas stream at a temperature sufficient to activate the carbonaceous material into an effective adsorbant. U.S. Pat. No. 6,521,021 to Pennline et al. discloses a method of recirculating semi-combusted coal which has been converted to a stream of thermally activated carbon sorbent and which is then reintroduced into the primary combustion chamber. U.S. Pat. Nos. 6,103,205 and 6,322,613 both to Wojtowicz et al. disclose a method of producing a carbon sorbent through the pyrolysis of a carbonaceous feedstock such as scrap tires, including a means of regenerating the sorbent through hot-gas vaporization and the production of a highly concentrated mercury rich gas stream which must be subsequently treated.

U.S. Pat. No. 5,787,823 to Knowles teaches the use of fly ash, which is an automatic byproduct of coal combustion, as a sorbent material owing to its natural filtration properties, namely, small particle size and large surface to mass ratio. Knowles does not discuss the possible effects of carbon (unburned fuel) in the fly ash nor does he discuss the separate roles played by the sorbing fly ash particles and the sorbing carbon particles. U.S. Pat. No. 5,672,323 to Bhat et al. teaches the injection of activated carbon as a flue gas treatment for mercury removal.

U.S. Pat. No. 6,372,187 to Madden et al. discloses the use of alkaline sorbents, such as limestone, followed by particulate filtration, as a means of removing mercury from flue gas streams.

All sorbent techniques result in a mercury rich particulate which is captured in some form of baghouse or other similar means for separating particulate from the flue gas stream prior to release to atmosphere. Inevitably, this mercury rich particulate complex will include mercury, sorbent material and some residual fly ash which may have escaped earlier stages of fly ash removal. Ultimately, this particulate complex must be disposed either in whole as for example by cementation, burial, etc. or by further processing the material either to reduce its volume or to regenerate the sorbent.

In the case of sorbent regeneration, the high cost of sorbent replacement may be avoided or partially offset, and in the case of volume reduction, the mercury is further concentrated to yield a mercury-sorbent volume which is substantially reduced, thus allowing for a more efficient containment or disposal. From an environmental viewpoint, ideally all the mercury originally present in the coal fuel should end up being collected in molecular or elemental form which should be easily manageable.

Considering the mercury-sorbent mixture to be a separate material requiring treatment leads one to consider means for removing mercury from the mixture. One such means is through pyrolysis of the mercury by heating the material to the mercury vaporization point, followed by a more efficient mercury removal technique than that which produced the mercury-sorbent material in the first instance. This is similar, in many aspects, to the problem of removing mercury from mercury contaminated soils and industrial materials.

For example, U.S. Pat. No. 6,268,590 to Gale et al. discloses a method for retorting mercury from dry, granular materials using an electrically heated kiln through which the material is screw transported. A condenser is used to remove the mercury vapor from the exhaust gas stream. Gale claims an advantage over earlier methods disclosed in U.S. Pat. No. 5,569,154 to Navetta and in U.S. Pat. No. 1,599,372 to Reed, in that his process is continuous and of practical size and complexity.

U.S. Pat. No. 6,024,931 to Hanulik discloses a rotary tubular kiln in which the material passes countercurrent to a combustion flame. U.S. Pat. Nos. 5,891,216 and 5,989,486 both to Washburn et al. teach a batch retorting method including the use of a stirring mechanism to assist in liberating the evaporated mercury vapor. U.S. Pat. No. 5,782,188 to Evans et al. discloses a rotary kiln which is operated as a pyrolytic incinerator in the absence of air, from which the combustible gas stream is condensed into the various product streams. U.S. Pat. No. 5,632,863 to Meador discloses a pyrolysis method by which used batteries may then be processed. U.S. Pat. No. 5,567,223 to Lindgren et al. describes a process whereby mercury contaminated material is heated within a furnace in the presence of selenium to form mercury selenide in a hot gas stream, thus leaving the decontaminated material for further use.

While each of these methods satisfies the functional need of providing a process for reducing the content of mercury in mercury contaminated materials, there remains a need for more efficient and economic methods. In addition, in certain cases such as in the treatment of fly ash for example, it is often desired to also reduce the level of carbon in the material. Thus, there is a need for a method that can allow for the simultaneous reduction of both mercury and carbon contents of a mercury contaminated material.

It is therefore an object of the invention to provide an improved method of reducing mercury from mercury contaminated materials. The method uses microwave energy.

It is also an object of the invention to provide a method allowing for a simultaneous reduction of mercury and carbon contents in mercury contaminated materials using microwave energy.

It is still an object of the invention to provide the use of a bubbling fluidized bed reactor vessel in the process according to the invention.

It is still an object of the invention to provide the use of a host bed material in the process according to the invention.

SUMMARY OF THE INVENTION

The present invention discloses a process and means whereby microwave energy is used to pyrolyse mercury from a mercury contaminated solid mixture consisting of fly ash and sorbent material. By means of this process, the mercury is produced as a hot vapour in a gas stream which is subsequently condensed, leaving the solid residue, namely the fly ash or the sorbent material available for reuse or clean disposal.

The process of the invention includes the use of microwave energy to provide the heat necessary for mercury vaporization without the need for any flame or combustion gases. The means for such a process, for example a metallic fluidized bed vessel into which the mercury contaminated material is continuously fed and removed and into which microwave energy is introduced, is a compact and efficient equipment which has certain advantages over other retorts and pyrolysers.

The basic mechanism for microwave heating in this instance is a combination of dielectric and ohmic heating whereby both electrical displacement and conduction currents are utilized to convert the electromagnetic energy directly into heat within the material. The efficiency of this energy conversion is dependent upon the dielectric properties of the material to be treated. In this instance, both the fly ash and sorbent materials contain significant receptor elements, principally carbon, which may be rapidly heated in a controlled manner. The mercury evaporates when the temperature is raised to about 357° C. (boiling point of mercury) at normal atmospheric pressure.

The use of a bubbling fluidized bed reactor vessel provides several practical advantages, including: self containment of the microwave energy, natural material agitation to assist flushing of mercury vapour, continuous material flow into and out of the vessel, and natural segregation of the solid and gas streams.

In accordance with a first aspect, the invention provides a method of reducing mercury level in a mercury contaminated material comprising placing the mercury contaminated material in a microwave reactor, providing a stream of gas in the microwave reactor, the stream causing agitation of the mercury contaminated material, and exposing the mercury contaminated material to microwave radiation so as to raise the temperature to at least 357° C., producing a vapour phase which contains mercury and a treated material.

In accordance with a second aspect, the invention provides a method of reducing mercury level in a mercury contaminated material comprising placing a carbon-free material in a microwave reactor, placing the mercury contaminated material in the microwave reactor, providing a stream of gas in the microwave reactor, the stream causing agitation of the mercury contaminated material and the carbon-free material so as to form a mixture, and exposing the mercury contaminated material to microwave radiation so as to raise the temperature to at least 357° C., producing a vapour phase which contains mercury and a treated material.

In accordance with a third aspect, the invention provides a method of reducing mercury and carbon levels in a mercury contaminated material comprising placing the mercury contaminated material in a microwave reactor, providing a stream of gas in the microwave reactor, the stream causing agitation of the mercury contaminated material, and exposing the mercury contaminated material to microwave radiation so as to raise the temperature to at least 600° C., producing a vapour phase which contains mercury and a treated material.

In accordance with a fourth aspect, the invention provides a method of reducing mercury and carbon levels in a mercury contaminated material comprising placing a carbon-free material in a microwave reactor, placing the mercury contaminated material in the microwave reactor, providing a stream of gas in the microwave reactor, the stream causing agitation of the mercury contaminated material and the carbon-free material so as to form a mixture, and exposing the mercury contaminated material to microwave radiation so as to raise the temperature to at least 600° C., producing a vapour phase which contains mercury and a treated material.

In a preferred embodiment of the first and third aspects, the method can further comprise the steps of removing the vapour phase from the reactor, terminating exposure of microwave radiation, removing the treated material from the reactor, and introducing fresh mercury contaminated material in the reactor. Also, in a preferred embodiment of the second and fourth aspects of the invention, the method can further comprise the steps of removing the vapour phase from the reactor, terminating exposure of microwave radiation, removing the treated material from the reactor, introducing fresh carbon-free material in the reactor, and introducing fresh mercury contaminated material in the reactor.

More preferably, the above steps may be continuous and optionally, the method may further comprise the step of introducing the vapour phase in a filtration device such as a cyclonic separator. The method according to the invention may also comprise the further step of trapping the vapour phase which contains mercury into a container.

The microwave reactor used in the method of the invention is preferably a fluidized bed reactor vessel, and the microwave radiation may have a frequency of between about 300 MHz and about 30 GHz. Preferably, the frequency can be within the Industrial, Scientific and Medical (ISM) bands of approximately 915 MHz and 2450 MHz. The microwave radiation power level and process duration time sufficient to produce a specific energy can be between about 2 kW-h/t and about 20 kW-h/t.

The ratio of mercury contaminated material to carbon-free material in the above second and fourth aspects of the invention can be between about 25/75 and about 75/25. Preferably, this ratio is about 50/50. The mercury contaminated material may have a mercury content of up to 50% by weight, and the material treated according to the method of the invention can have a mercury content of less than about 10 ppb. Preferably, the mercury content of the treated material is less than 5 ppb. The carbon content of the mercury contaminated material can be up to 60% by weight.

In accordance with a sixth aspect, there is provided an apparatus which is specially adopted to carry out the method according to the invention.

The method of reducing the mercury content of mercury contaminated materials according to the invention uses microwave energy, it is efficient, economic and versatile.

BRIEF DESCRIPTION OF THE DRAWINGS

These and other advantages of the invention will become apparent upon reading the following detailed description and upon referring to the drawings in which.

Figure 1:
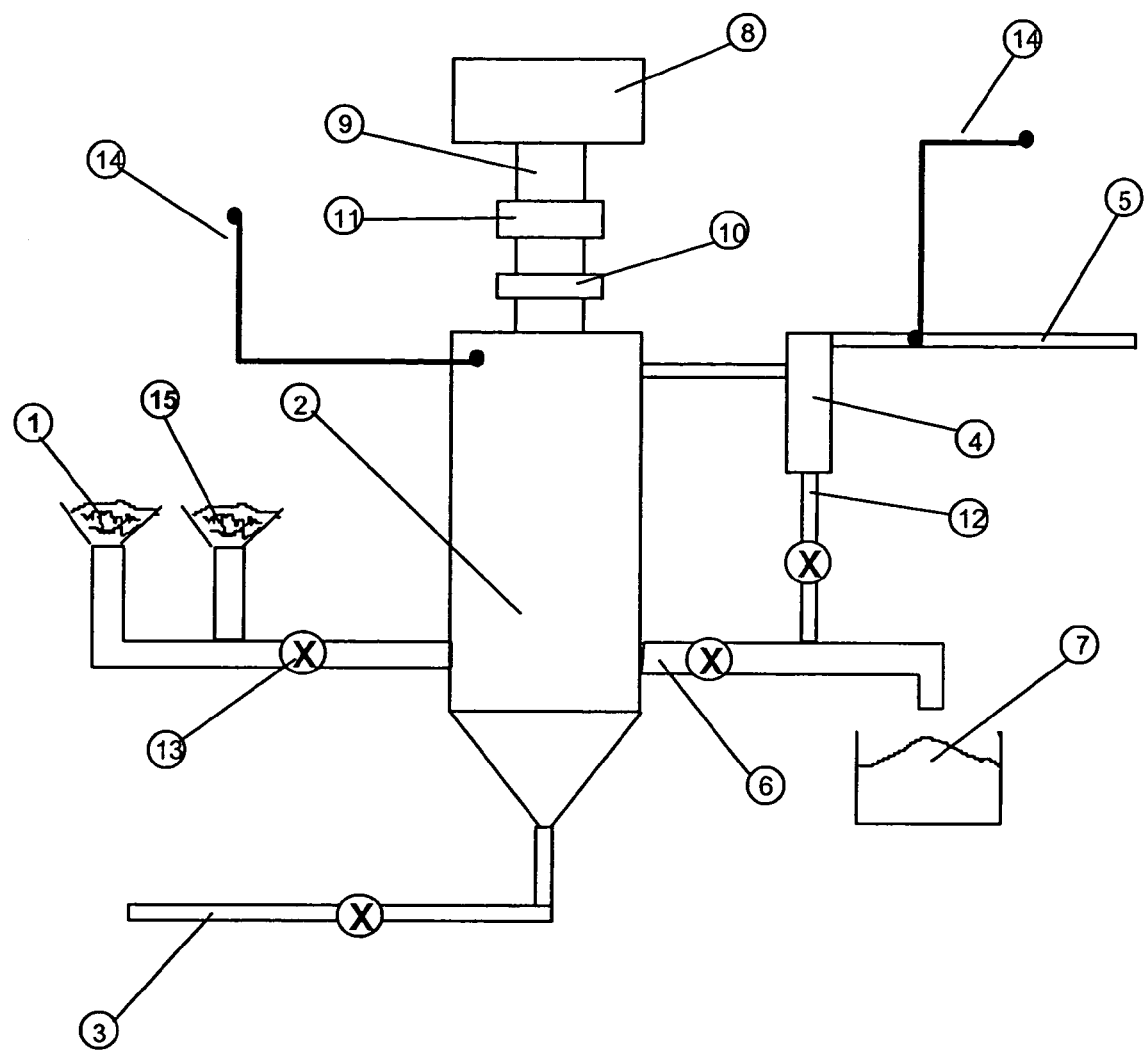
FIG. 1 is schematic representation of an apparatus for carrying out an embodiment of the method according to the invention.

While the invention has been described in conjunction with the illustrated embodiment, it will be understood that it is not intended to limit the invention to such embodiment. On the contrary, it is intended to cover all alternatives, modifications and equivalents as may be included within the spirit and scope of the invention as defined by the appended claims.

DETAILED DESCRIPTION OF THE INVENTION

Referring to FIG. 1 which illustrates a preferred embodiment of the present invention, an input feedstream (1) of mercury contaminated material is introduced in a continuous fashion into a microwave reactor vessel (2) which is operated as a bubbling fluidized bed. The operation of the bubbling fluidized bed is well known in the art. Integral to this preferred embodiment is the use of a dual composition fluidized bed consisting of a host bed material in addition to the mercury contaminated material. The host bed material is selected as an essentially carbon-free mineral which is inert to the process at hand and which can withstand the operating conditions of the process without chemical or mechanical effect. The host bed material is further described as having a size distribution and density which are sufficiently greater than that of the sorbent material such that the sorbent material is more highly fluidized within the reactor vessel. Notwithstanding this, the dynamic action of the host bed material is such that the host bed material and the sorbent material feedstream form a single, integral fluidized bed medium within the reactor vessel. In addition to its size and density properties described above, the host bed material is selected to be a microwave receptive material such that it can be directly heated by microwave energy irrespective of the properties of the other material within the bed. It has been found that the use of this dual composition fluidized bed, in the proportion of at least 50% by weight host material, allows the process to be operated at a significantly higher temperature without causing fusing or clinkering of the carbon rich sorbent material, hence leading to a higher unit throughput.

The feed material (1) within the reactor vessel (2) forms a fluidized bed by means of a gas stream (3) which is fed into the base of the reactor through a system of nozzles or closely spaced apertures in a solid plate, thereby effectively suspending the material in the reactor vessel. This aspect of fluidized bed operation is determined by the gas velocity needed to effectively suspend the material and is well known to those practicing in the art. The fluidizing gas passes through the reactor vessel and exits through a filtration device (4), such as a cyclonic separator, which removes all or most of the entrained fine particulate from the gas stream. The gas stream (5), now essentially particulate free, is available for further treatment such as mercury removal.

Material being fed into the reactor vessel is continuously removed, for example by means of an overflow discharge pipe (6), and is collected in a hopper (7) or other suitable container for further treatment or use.

Attached to the reactor vessel is a means by which a microwave generator (8) is connected, usually a waveguide (9), in which a microwave transparent barrier (10) is installed to effectively isolate the reactor vessel atmosphere from the waveguide.

Microwave energy is supplied to the reactor vessel, which is constructed of a suitable metallic material so as to effectively contain the microwave fields introduced therein. When in contact with the fluidized material within the reactor vessel, a substantial portion of the microwave energy is converted into heat, thereby raising the fluidized bed temperature. The efficiency of coupling of the microwave energy into the fluidized bed material is controlled by means of a tuning device (11) installed in the waveguide. Such tuning devices may be electronically controlled to continuously optimize the power transfer. When the fluidized bed temperature reaches the boiling point of mercury, or approximately 357° C. at normal atmospheric pressure, the mercury passes into the vapor phase and is carried out of the vessel in the fluidizing gas stream. The fluidizing gas may be ambient air if one wishes to combust the bed material or the gas may be selected to be inert (for example nitrogen) with respect to mercury and carbon, hence the heating process within the reactor vessel cannot combust the sorbent material.

The hot gas stream which exits the reactor vessel passes through a cyclonic separator as described above. Since the gas temperature is maintained above the boiling point of mercury, the mercury vapor is carried on to the gas discharge (5) where it is condensed or otherwise filtered for recovery.

Disentrained particulate (12) from the cyclonic separator is combined with the other discharge solids (7).

As is known in the fluidized bed art, various valves (13) are employed in the material streams into and out of the reactor vessel (and cyclonic separator) in order to prevent gas leakage.

In order to monitor and control the heating process, various instrumentation (14) are installed in the apparatus. Temperature probes are installed at various positions within the fluidized bed and all feed and discharge lines, including the gas inlet and outlet lines. Gas pressure and product monitors are installed in all gas lines. Material flow through the reactor vessel is measured either through flow meters or by mass measurements. The system so instrumented may be operated manually or automatically to maintain the system operation within a set minimum-maximum boundary.

Incorporation of the host bed material is by means of a separate feedstream (15) which is merged with the contaminated material feedstream and controlled to offset the host bed material loss through the reactor. If desired, the host bed material may be separated from the reconstituted sorbent material (for example by flotation or gravity separation) and recirculated to the input hopper for reuse.

In accordance with a preferred embodiment of the invention, when an inert gas is used for fluidization, mercury contaminated material may be effectively purged of mercury without combustion, thereby allowing the sorbent material to be reused. The mercury thus released may, as described above, be effectively captured. This method of retorting mercury has distinct advantages over other means of heating, owing mainly to the efficiency and speed of heat generation using microwave energy.

EXAMPLE 1

The apparatus as schematically represented in FIG. 1 was set up to process a quantity of coal combustion fly ash which was known to contain mercury. A microwave frequency of 915 MHz was used. The fluidizing gas was ambient air.

The feedstock fly ash was processed at a temperature of approximately 820° C. Throughout the test period of approximately 400 minutes duration, the material was passed through the reactor vessel at a rate of approximately 6 lbs per minute.

The mercury content of the feedstock was measured to be 79 parts per billion (ppb). The unburned carbon content, characterized as the LOI (Loss On Ignition), was measured to be 8.5%.

Samples of processed ash were taken periodically through the experiment and the mercury content was measured. The results obtained are shown in Table 1 below. The LOI of the treated material was 1.5%.

TABLE 1

Mercury Measurements

| Time (minutes) | Product Mercury (ppb) | Cyclone Mercury (ppb) |
| --- | --- | --- |
| 0 | 79 | 79 |
| 167 | 22 | 23 |
| 197 | 11 | 1 |
| 392 | 8 | 2 |
| 419 | 7 | 3 |

It can be seen that, once the process has reached steady state operation with respect to mercury evolution, the mercury content of the discharge material (product and cyclone discharge) has been substantially reduced compared to its initial value. One may reasonably expect that the mercury level may be further reduced by slowing the feed rate, thus increasing the average residence time of the material within the reactor. Nevertheless, the effectiveness of the process in reducing mercury concentration is evident.

EXAMPLE 2

The apparatus as schematically represented in FIG. 1 was set up to process a quantity of coal combustion fly ash which was known to contain mercury. A microwave frequency of 915 MHz was used. The fluidizing gas was ambient air.

The feedstock fly ash was processed at a temperature of approximately 820° C. Throughout the test period of approximately 500 minutes duration, the material was passed through the reactor vessel at a rate of approximately 6 lbs per minute.

The mercury content of the feedstock was measured to be 33 parts per billion (ppb). The unburned carbon content, characterized as the LOI (Loss On Ignition), was measured to be 17.5%.

Samples of processed ash were taken periodically through the experiment and the mercury content was measured. The results obtained are shown in Table 2 below. The LOI of the treated material was 0.4%.

TABLE 2

Mercury Measurements

| Time (minutes) | Product Mercury (ppb) | Cyclone Mercury (ppb) |
| --- | --- | --- |
| 0 | 33 | 33 |
| 185 | 25 | 15 |
| 481 | 3 | 7 |

EXAMPLE 3

The apparatus as schematically represented in FIG. 1 was set up to process a quantity of coal combustion fly ash which was known to contain mercury. A microwave frequency of 915 MHz was used. The fluidizing gas was ambient air.

The feedstock fly ash was processed at a temperature of approximately 820° C. Throughout the test period of approximately 400 minutes duration, the material was passed through the reactor vessel at a rate of approximately 6 lbs per minute.

The mercury content of the feedstock was measured to be 142 parts per billion (ppb). The unburned carbon content, characterized as the LOI (Loss On Ignition), was measured to be 4.5%.

Samples of processed ash were taken periodically through the experiment and the mercury content was measured. The results obtained are shown in Table 3 below. The final LOI was 0.3%.

TABLE 3

Mercury Measurements

| Time (minutes) | Product Mercury (ppb) | Cyclone Mercury (ppb) |
| --- | --- | --- |
| 0 | 142 | 142 |
| 187 | 8 | 7 |
| 230 | 8 | 1 |
| 300 | 2 | 1 |
| 337 | 8 | 1 |

It is evident from the foregoing Examples that the process disclosed herein is effective in reducing mercury concentrations irrespective of the initial mercury content of the material or its LOI.

Although the examples cited herein were conducted at a microwave frequency of 915 MHz, being one of the readily available electromagnetic ISM (Industrial, Scientific, Medical) bands for unlicensed operation, it is within the scope of this present invention that any frequency generally within the microwave region (300 MHz–30 GHz) may be used, the principal effect being in the dimensions of the resonant reactor vessel in a manner which is well understood by one practicing in the field of microwave.

In the examples cited above, the fluidizing gas was ambient air since the processing operation was directed primarily to the combustion of the unburned carbon in the ash as well as the volatilization of the mercury. In a manner directly analogous to the above examples, as has been practiced by the present inventor, one may substitute an inert gas, nitrogen for example, for ambient air, with the result that the material effectively heats (due to microwave absorption) although without any combustion.

It is also noted that, while the above examples use an operating temperature of approximately 820° C. for the purpose of combusting unburned carbon from the ash, it is only necessary to achieve a temperature of 357° C. in order to vaporize mercury (at normal atmospheric pressure), hence the process according to the invention may be operated at any temperature at or above 357° C. (at normal atmospheric pressure) provided that one does not exceed the temperature at which the ash constituents will significantly fuse and agglomerate; such a condition will be known to one practicing in the art of metallurgical processing of minerals and ores.

While the cited examples utilize a reactor vessel which operates on the known principles of a bubbling fluidized bed, it is within the scope of this present invention that one may utilize other vessel designs which can be adapted for use as microwave containment vessels. This includes, but is not limited to, rotary kilns, vibrating drums, multimode cavities; transport fluidized beds, packed tubes and conveyorized cavities.

Thus it is apparent that there has been provided in accordance with the invention a method of reducing the mercury content of mercury contaminated materials using microwave energy, that fully satisfy the needs and advantages set forth above. While the invention has been described in conjunction with the illustrated embodiment, it is evident that many alternatives, modifications and variations will be apparent to those skilled in the art in light of the foregoing description. Accordingly, it is intended to embrace all such alternatives, modifications and variations as fall within the spirit and broad scope of the invention.

What is claimed is:

1. A method of reducing mercury level in a mercury contaminated material comprising:
   (a) placing a carbon-free material in a microwave reactor;
   (b) placing the mercury contaminated material in the microwave reactor;
   (c) providing a stream of gas introduced from substantially below said mercury contaminated material wherein said gas and mercury contaminated material form a fluidized bed in the microwave reactor, the stream causing agitation of the mercury contaminated material and the carbon-free material so as to form a mixture; and
   (d) exposing the mercury contaminated material to microwave radiation so as to raise the temperature to at least 357° C., producing a vapour phase which contains mercury and a treated material.

2. A method of reducing mercury and carbon levels in a mercury contaminated material comprising:
   (a) placing a carbon-free material in a microwave reactor;
   (b) placing the mercury contaminated material in the microwave reactor;
   (c) providing a stream of gas introduced from substantially below said mercury contaminated material wherein said gas and mercury contaminated material form a fluidized bed in the microwave reactor, the steam causing agitation of the mercury contaminated material and the carbon-free material so as to form a mixture; and
   (d) exposing the mercury contaminated material to microwave radiation so as to raise the temperature to at least 600° C., producing a vapour phase which contains mercury and a treated material.

3. The method according to claim 1 or 2 further comprising the steps of:
   (e) removing the vapour phase from the reactor;
   (f) terminating exposure of microwave radiation;
   (g) removing the treated material from the reactor;
   (h) introducing fresh carbon-free material in the reactor; and
   (i) introducing fresh mercury contaminated material in the reactor.

4. The method according to claim 3, wherein steps (e) through (i) are continuous steps.

5. The method according to claim 1 or 2, wherein a ratio of mercury contaminated material to carbon-free material of between 25/75 and 75/25 is used.

6. The method according to claim 5, wherein said ratio is about 50/50.

7. The method according to claim 1 or 2, wherein said carbon-free material is a microwave receptive material having a size distribution and density which are greater than that of the mercury contaminated material, and is selected from manganese dioxide, silica, metallic oxides, silicaceous oxides and mixtures thereof.

8. The method according to claim 7, wherein said carbon-free material is selected from manganese dioxide and silica.

9. The method according to claim 2 further comprising the steps of:
   (a) removing the vapour phase from the reactor;
   (b) terminating exposure of microwave radiation;
   (c) removing the treated material from the reactor;
   (d) introducing fresh carbon-free material in the reactor; and
   (d) introducing fresh mercury contaminated material in the reactor.

10. The method according to claim 3 further comprising the step of introducing the vapour phase in a filtration device.

11. A method of reducing mercury level in a mercury contaminated material, comprising:
   (a) placing the mercury contaminated material in a microwave reactor;
   (b) providing a stream of gas introduced from substantially below said mercury contaminated material wherein said gas and mercury contaminated material form a fluidized bed in the microwave reactor, the stream causing agitation of the mercury contaminated material; and,
   (c) exposing the mercury contaminated material to microwave radiation so as to raise the temperature to at least 357° C, producing a vapour phase which contains mercury and a treated material,
   wherein said method is maintained continuously.

* * * * *